US012643566B2

(12) United States Patent
Quan

(10) Patent No.: US 12,643,566 B2
(45) Date of Patent: Jun. 2, 2026

(54) VEHICLE CONTROL DEVICE AND AUTONOMOUS DRIVING SYSTEM

(71) Applicant: HITACHI ASTEMO, LTD., Hitachinaka (JP)

(72) Inventor: Qixian Quan, Tokyo (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 0 days.

(21) Appl. No.: 18/566,175

(22) PCT Filed: Mar. 1, 2022

(86) PCT No.: PCT/JP2022/008652
§ 371 (c)(1),
(2) Date: Dec. 1, 2023

(87) PCT Pub. No.: WO2023/047628
PCT Pub. Date: Mar. 30, 2023

(65) Prior Publication Data
US 2024/0246565 A1      Jul. 25, 2024

(30) Foreign Application Priority Data

Sep. 21, 2021      (JP) ................................. 2021-153263

(51) Int. Cl.
*B60W 60/00*          (2020.01)
*B60W 30/16*          (2020.01)
(Continued)
(52) U.S. Cl.
CPC .......... *B60W 60/001* (2020.02); *B60W 30/16* (2013.01); *B60W 50/0098* (2013.01);
(Continued)

(58) Field of Classification Search
CPC ............... B60W 60/001; B60W 30/16; B60W 50/0098; B60W 2552/20; B60W 2556/00;
(Continued)

(56) References Cited

U.S. PATENT DOCUMENTS

2008/0195310 A1      8/2008   Yamada
2015/0094928 A1      4/2015   Matsumura
(Continued)

FOREIGN PATENT DOCUMENTS

CN          104512415          4/2015
JP          2003-260951 A      9/2003
(Continued)

OTHER PUBLICATIONS

International Search Report with English Translation and Written Opinion of International Patent Application No. PCT/JP2022/008652 dated Apr. 19, 2022 (10 pages).
(Continued)

*Primary Examiner* — Hussein Elchanti
(74) *Attorney, Agent, or Firm* — Foley & Lardner LLP

(57)          ABSTRACT

In a vehicle control device 100, a rough-road travel unit 1008 determines whether or not there is a rough road within a predetermined range in front of a vehicle based on a position of the vehicle estimated by a position estimation unit 1001 and a position of a rough road acquired by a map information acquisition unit 1011, and determines whether or not the rough road has been detected based on road surface information acquired by an outside environment information acquisition unit 1002. When it is determined that there is the rough road within the predetermined range in front of the vehicle based on the position of the vehicle estimated by the position estimation unit 1001 and the position of the rough road acquired by the map information acquisition unit 1011, and it is determined that the rough (Continued)

road is not detected based on the road surface information acquired by the outside environment information acquisition unit 1002, a rough-road detection-omission determination unit 1006 determines whether or not rough-road detection is omitted based on the position of the rough road and a detectable section of a stereo camera 200.

11 Claims, 8 Drawing Sheets

(51) Int. Cl.
  *B60W 50/00*　　　　(2006.01)
  *G01C 21/34*　　　　(2006.01)
(52) U.S. Cl.
  CPC ... *G01C 21/3461* (2013.01); *B60W 2420/403* (2013.01); *B60W 2520/10* (2013.01); *B60W 2552/20* (2020.02); *B60W 2556/00* (2020.02)
(58) Field of Classification Search
  CPC ........ B60W 2420/403; B60W 2520/10; G01C 21/3461
  See application file for complete search history.

(56) References Cited

U.S. PATENT DOCUMENTS

| | | | |
|---|---|---|---|
| 2016/0121924 A1* | 5/2016 | Norstad | B62D 5/0406 |
| | | | 701/41 |
| 2017/0151850 A1 | 6/2017 | Deigmöller et al. | |
| 2020/0073405 A1 | 3/2020 | Xu et al. | |
| 2021/0086695 A1* | 3/2021 | Mahnken | B62D 21/20 |
| 2021/0389448 A1* | 12/2021 | Miyaoka | G01S 13/931 |
| 2023/0177840 A1* | 6/2023 | Telpaz | G06V 10/82 |

FOREIGN PATENT DOCUMENTS

| | | |
|---|---|---|
| JP | 2008-197015 A | 8/2008 |
| JP | 2015-067154 A | 4/2015 |
| JP | 2017-100705 A | 6/2017 |

OTHER PUBLICATIONS

Chinese Office Action issued in CN Application No. 202280040884.6 dated Mar. 25, 2026 with Machine Translation (16 Pages).

* cited by examiner

VEHICLE CONTROL DEVICE AND AUTONOMOUS DRIVING SYSTEM

TECHNICAL FIELD

The present invention relates to a vehicle control device and an autonomous driving system.

The present application claims priority based on Japanese Patent Application No. 2021-153263 filed on Sep. 21, 2021, the contents of which are incorporated herein by reference.

BACKGROUND ART

In order to improve the comfort of traveling of a vehicle, it is necessary to adapt the suspension of the vehicle to various road conditions. Recently, there has been developed a technique for improving excellent traveling comfort (in other words, steering stability and ride comfort) by detecting a road surface state in front of a vehicle using a stereo camera attached to a windshield and appropriately adjusting a suspension of the vehicle based on the detected road surface state.

For example, PTL 1 below discloses a system including a stereo sensor unit that includes a stereo camera and generates image data, a calculation unit that extracts a related image portion from the image data based on future vehicle route data and calculates a road non-uniform change on a future vehicle route of a vehicle based on the generated image data, and a suspension control unit that generates a signal for adapting a suspension of the vehicle based on the calculated road non-uniform change.

CITATION LIST

Patent Literature

PTL 1: JP 2017-100705 A

SUMMARY OF INVENTION

Technical Problem

However, when the stereo camera is used, the following problem occurs due to limitation of a detection range of the camera. Specifically, as illustrated in FIG. 6, for example, when the stereo camera is attached to a windshield, a detection range S of the stereo camera in a vertical direction is limited by the performance of the camera, the height h of an attachment position, the size of the angle of view θ of the camera in the vertical direction, and the like. With such a detection range S, a detectable section of the stereo camera in a forward direction of the vehicle is determined by a detectable section lower limit (Deadlm1) and a detectable section upper limit (Deadlm2). Then, when there is a rough road such as unevenness, if the rough road exists within the detectable section of the stereo camera, the rough road is detected by the stereo camera.

However, for example, as illustrated in FIG. 7A, when the vehicle travels following the preceding vehicle, and an inter-vehicle distance between the host vehicle and the preceding vehicle is smaller than the detectable section upper limit (Deadlm2), it is not possible for the stereo camera to detect a rough road even though even if the rough road exists within the detectable section. When the vehicle travels in parallel with the preceding vehicle in such a state, as illustrated in FIG. 7B, the vehicle passes through the detectable section lower limit (Deadlm1) in a state where the rough road is not detected (that is, the position from the host vehicle to the rough road is smaller than Deadlm1), and a problem of detection omission of a rough road occurs. As a result, the vehicle travels on the rough road without adjusting the suspension.

The present invention has been made to solve such a technical problem, and an object of the present invention is to provide a vehicle control device and an autonomous driving system capable of preventing detection omission of a rough road.

Solution to Problem

According to the present invention, a vehicle control device includes a position estimation unit that estimates a position of a vehicle, an outside environment information acquisition unit that acquires outside environment information including road surface information based on an image captured by an in-vehicle camera that captures an image of a front of the vehicle, a map information acquisition unit that acquires map information including a position of a rough road, a rough-road travel unit that adjusts at least one of a suspension and a vehicle speed of the vehicle and travels on a rough road, a rough-road determination unit that determines whether or not there is a rough road within a predetermined range in front of the vehicle based on the position of the vehicle estimated by the position estimation unit and the position of the rough road acquired by the map information acquisition unit, and determines whether or not the rough road has been detected based on the road surface information acquired by the outside environment information acquisition unit, and a rough-road detection-omission determination unit that determines whether or not rough-road detection is omitted based on the position of the rough road acquired by the map information acquisition unit and a detectable section of the in-vehicle camera, when it is determined that there is the rough road within the predetermined range in front of the vehicle based on the position of the vehicle estimated by the position estimation unit and the position of the rough road acquired by the map information acquisition unit, and it is determined that the rough road is not detected based on the road surface information acquired by the outside environment information acquisition unit.

In the vehicle control device according to the present invention, when it is determined that there is the rough road within the predetermined range in front of the vehicle based on the position of the vehicle estimated by the position estimation unit and the position of the rough road acquired by the map information acquisition unit, and it is determined that the rough road is not detected based on the road surface information acquired by the outside environment information acquisition unit, the rough-road detection-omission determination unit determines whether or not rough-road detection is omitted based on the position of the rough road acquired by the map information acquisition unit and the detectable section of the in-vehicle camera. In this manner, even when the detectable section of the in-vehicle camera is blocked by the preceding vehicle, it is possible to reliably prevent detection omission of a rough road.

Advantageous Effects of Invention

According to the present invention, it is possible to prevent detection omission of a rough road.

DESCRIPTION OF EMBODIMENTS

Hereinafter, an embodiment of a vehicle control device and an autonomous driving system according to the present invention will be described with reference to the drawings. In the following description, the vertical, horizontal, front-rear directions and positions are based on a vehicle on which the vehicle control device is mounted. In addition, in the following description, unless otherwise specified, it is assumed that it is not possible for a vehicle to avoid a rough road (in other words, it is not possible for the vehicle to travel to bypass the rough road).

[Regarding Vehicle Control Device]

Figure 1:
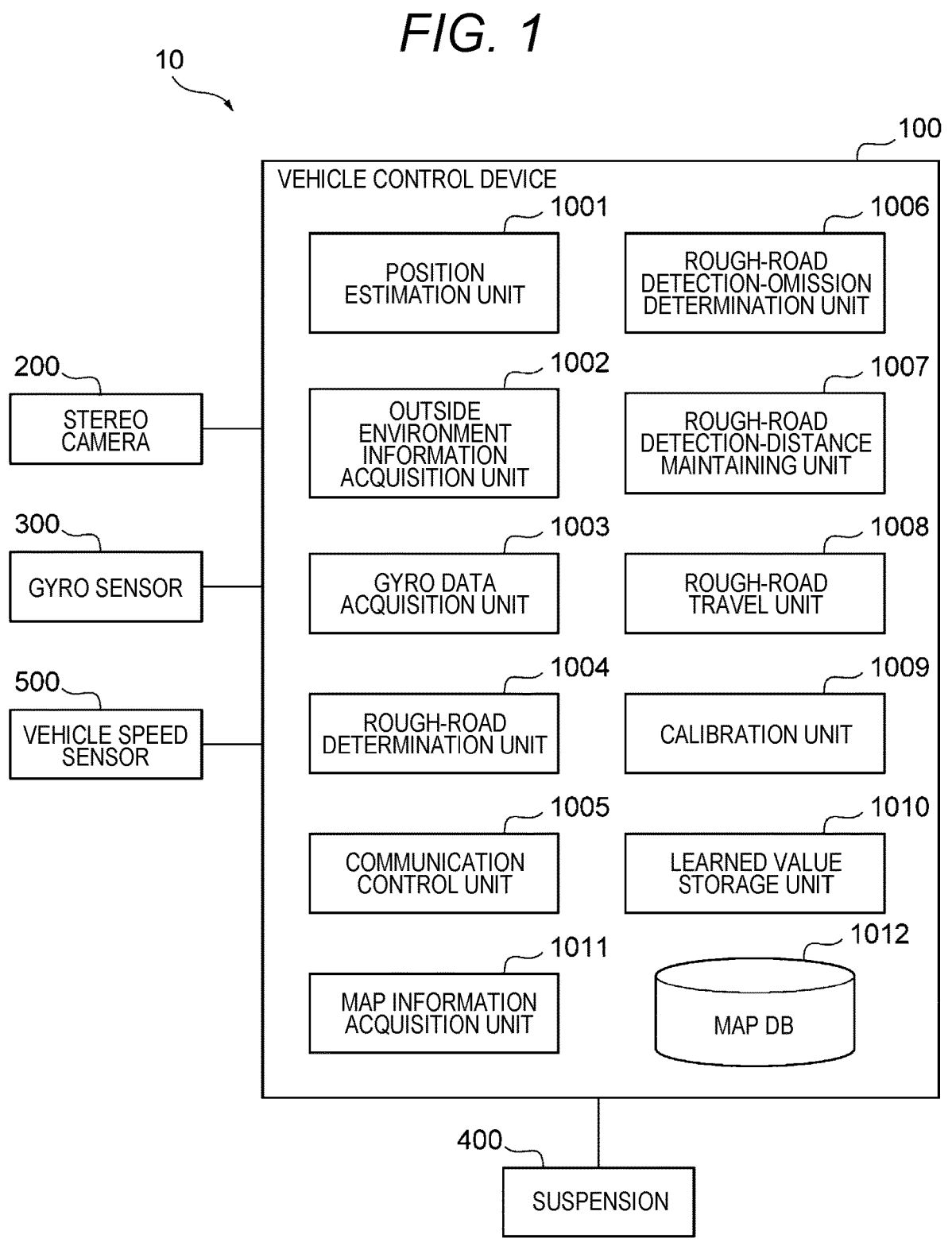
FIG. 1 is a block diagram illustrating a vehicle control device according to an embodiment.

FIG. 1 is a block diagram illustrating a vehicle control device according to an embodiment. A vehicle control device 100 in the present embodiment is mounted on a vehicle 10. Although FIG. 1 illustrates an example of a passenger car as the vehicle 10, the vehicle 10 is not limited to a passenger car, and may be a bus, a truck, a trailer, or the like. In addition to the vehicle control device 100, the vehicle 10 includes a stereo camera 200, a gyro sensor 300, a suspension 400, and the like.

The stereo camera 200 corresponds to an "in-vehicle camera" described in the claims, and captures an image of a state in front of the vehicle 10. The stereo camera 200 includes, for example, a pair of right and left cameras arranged at a predetermined optical axis interval (base line length) so that optical axes of the cameras are parallel to each other. The stereo camera 200 is attached to the windshield of the vehicle 10. Each of the pair of right and left cameras includes an image sensor such as a CMOS, an optical lens, and the like. Note that the in-vehicle camera may be a monocular camera or the like in addition to the stereo camera.

The gyro sensor 300 detects acceleration and vibration of the vehicle 10. A vehicle speed sensor 500 detects the speed of the vehicle 10.

The suspension 400 is disposed on each wheel of vehicle 10. The suspension 400 is, for example, one of an electromagnetic suspension including an electric motor (linear motor, rotating motor) as an electric actuator, a semi-active suspension including a hydraulic buffer (hydraulic damper, hydraulic shock absorber) as a liquid pressure actuator capable of adjusting a damping force, a full active suspension including a drive cylinder (hydraulic cylinder, air cylinder) as a liquid pressure or atmospheric pressure actuator, and an air suspension including an air spring as an atmospheric pressure actuator also serving as a vehicle height adjustment device capable of adjusting the height (vehicle height) of the vehicle. The actuator (electric motor, hydraulic buffer, drive cylinder, air spring, and the like) is controlled by the vehicle control device 100 (more specifically, rough-road travel unit 1008 of the vehicle control device 100). In other words, the rough-road travel unit 1008 adjusts the suspension 400 by controlling the actuator (electric motor, hydraulic buffer, drive cylinder, air spring, and the like).

The vehicle control device 100 includes, for example, a microcomputer formed by combining a central processing unit (CPU) that performs calculation, a read only memory (ROM) as a secondary storage device in which a program for calculation is recorded, and a random access memory (RAM) as a temporary storage device that stores the calculation progress and temporary control variables. Such a vehicle control device 100 performs each control of the entire vehicle 10 by executing the stored program.

As illustrated in FIG. 1, the vehicle control device 100 in the present embodiment includes a position estimation unit 1001, an outside environment information acquisition unit 1002, a gyro data acquisition unit 1003, a rough-road determination unit 1004, a communication control unit 1005, a rough-road detection-omission determination unit 1006, a rough-road detection-distance maintaining unit 1007, a rough-road travel unit 1008, a calibration unit 1009, a learned value storage unit 1010, a map information acquisition unit 1011, and a map database (map DB) 1012.

The position estimation unit 1001 estimates the position of the vehicle 10 by using a satellite signal receiver (not illustrated) built in the vehicle 10 or the vehicle control device 100. Specifically, the position estimation unit 1001 estimates the position of the vehicle 10, that is, the latitude and longitude by analyzing signals received by the satellite signal receiver from a plurality of satellites constituting a satellite navigation system. Note that the position estimation unit 1001 may estimate the position of the vehicle 10 based on the detection result of the gyro sensor 300.

The outside environment information acquisition unit 1002 acquires outside environment information based on an image captured by the stereo camera 200. The outside environment information includes, for example, road surface image data indicating road surface information, image data of the preceding vehicle and the oncoming vehicle, and image data of traffic signs, lanes, and the like.

The gyro data acquisition unit 1003 corresponds to a "vibration acquisition unit" described in the claims, and acquires the vibration of the vehicle 10 based on detection data of the gyro sensor 300.

The rough-road determination unit 1004 determines whether or not there is a rough road within a predetermined range (for example, within 2 km) in front of the vehicle based on the position of the vehicle 10 estimated by the position estimation unit 1001 and the position of the rough road acquired by the map information acquisition unit 1011. In addition, the rough-road determination unit 1004 determines whether or not a rough road is detected in front of the vehicle 10 based on the road surface image data acquired by the outside environment information acquisition unit 1002. In addition, when the rough-road detection-omission determination unit 1006 determines that rough-road detection is omitted, and the position of the rough road acquired by the outside environment information acquisition unit 1002 is within the predetermined range in front of the vehicle 10, the rough-road determination unit 1004 determines that there is a rough road on the traveling road surface. Note that the rough road here refers to a road surface having a height difference such as unevenness, a step, or a protrusion on the road surface, for example, and a road surface on which vibration generated when the vehicle travels on the road surface is equal to or greater than a vibration threshold value set in advance.

The communication control unit 1005 controls transmission and reception of information to and from an external server or the like via a communication device (not illustrated) provided in the vehicle 10. Specifically, the communication control unit 1005 performs control to periodically perform transmission of the learned value of the vehicle speed and the learned value of the suspension adjustment, which are stored in the learned value storage unit 1010, to the external server such as a cloud, and reception of the learned value of the vehicle speed and the learned value of the suspension adjustment, which are stored in the external server. When receiving the learned value of the vehicle speed and the learned value of the suspension adjustment, which are stored in the external server, the communication control unit 1005 stores the received learned values in the learned value storage unit 1010.

Figure 6:
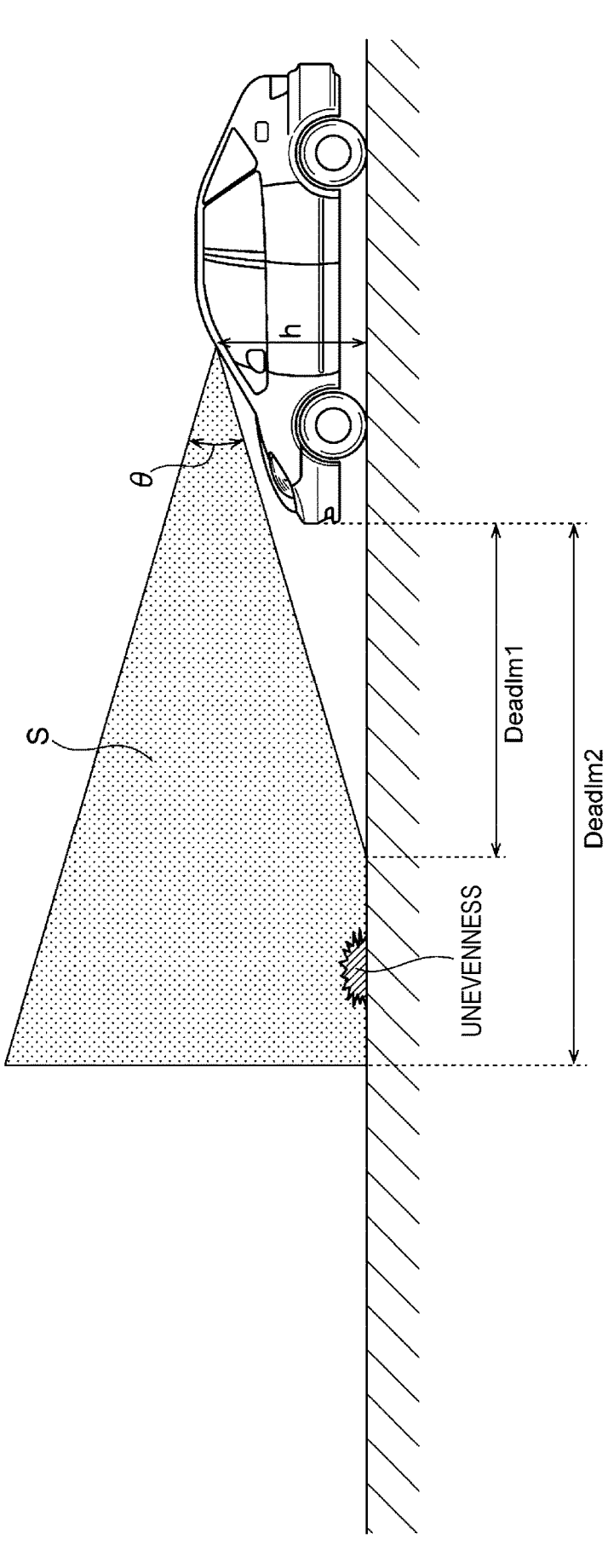
FIG. 6 is a diagram for explaining a detection range and a detectable section of a stereo camera.
Figure 7A:
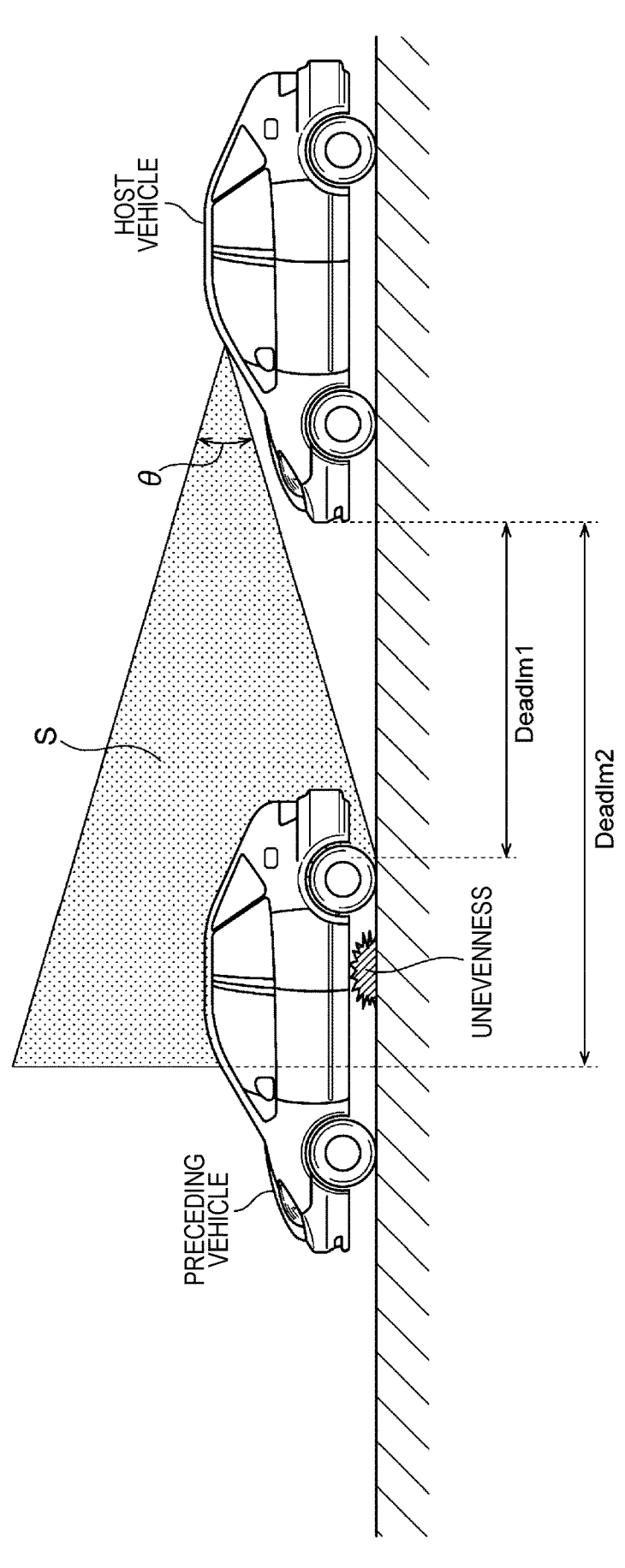
FIG. 7A is a diagram for explaining a conventional problem.
Figure 7B:
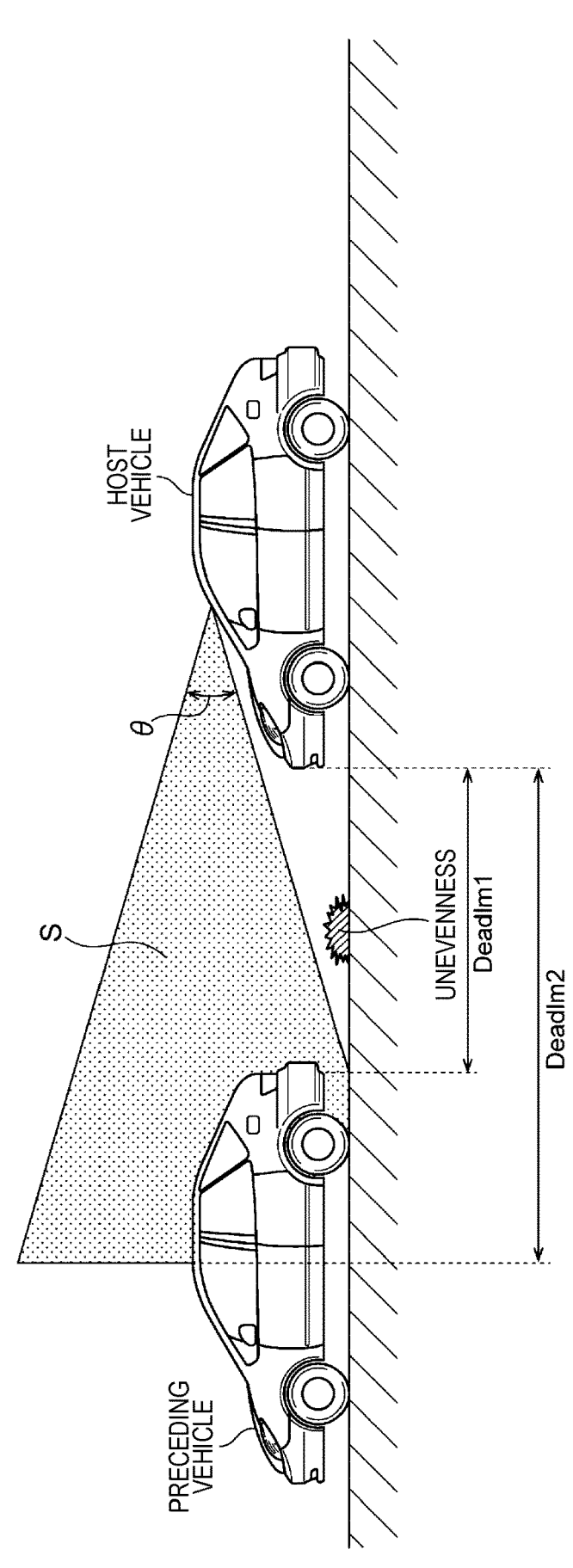
FIG. 7B is a diagram for explaining the conventional problem.

When the rough-road determination unit 1004 determines that there is the rough road within the predetermined range in front of the vehicle based on the position of the vehicle 10 estimated by the position estimation unit 1001 and the position of the rough road acquired by the map information acquisition unit 1011, and the rough-road determination unit 1004 determines that the rough road is not detected based on the road surface information acquired by the outside environment information acquisition unit 1002, the rough-road detection-omission determination unit 1006 determines whether or not rough-road detection is omitted based on the position of the rough road acquired by the map information acquisition unit 1011 and the detectable section of the stereo camera 200. Note that, as described above, the detectable section of the stereo camera 200 is a section between a detectable section lower limit (Deadlm1) and a detectable section upper limit (Deadlm2) (see, for example, FIG. 6).

The rough-road detection-distance maintaining unit 1007 maintains the distance from the preceding vehicle so that the detectable section of the stereo camera 200 is not blocked by the preceding vehicle.

The rough-road travel unit 1008 adjusts at least one of the suspension and the vehicle speed of the vehicle to travel on the rough road. Specifically, the rough-road travel unit 1008 adjusts the suspension 400 based on the road surface image data acquired by the outside environment information acquisition unit 1002 to travel on the rough road. In addition, when the rough-road detection-omission determination unit 1006 determines that rough-road detection has been omitted, the rough-road travel unit 1008 adjusts the suspension 400 of the vehicle 10 based on the learned value of the suspension adjustment stored in the learned value storage unit 1010, and travels.

Furthermore, when the rough-road determination unit 1004 determines that there is the rough road within the predetermined range in front of the vehicle based on the position of the vehicle 10 estimated by the position estimation unit 1001 and the position of the rough road acquired by the map information acquisition unit 1011, the rough-road travel unit 1008 adjusts the vehicle speed based on the learned value of the vehicle speed stored in the learned value storage unit 1010, and travels.

The calibration unit 1009 calibrates the vehicle speed based on the vibration of the vehicle acquired by the gyro data acquisition unit 1003 when the vehicle travels on the rough road. Specifically, when the vehicle 10 travels on the rough road, the calibration unit 1009 calculates the vibration of the vehicle 10 based on the gyro data acquired by the gyro data acquisition unit 1003. Then, when the calculated vibration of the vehicle 10 exceeds a threshold value set in advance, it is recognized that the vibration is large, and the vehicle speed for next traveling on the rough road is calibrated. Further, the calibration unit 1009 updates the learned value by storing the calibrated vehicle speed in the learned value storage unit 1010 in association with the position of the rough road.

The learned value storage unit 1010 stores the vehicle speed calibrated by the calibration unit 1009, as the learned value of the vehicle speed, in association with the position of the rough road. In addition, the learned value storage unit 1010 stores an adjustment value of the suspension adjusted by the rough-road travel unit 1008, as the learned value of suspension adjustment, in association with the position of the rough road.

The map information acquisition unit 1011 acquires map information from the map DB 1012. The map information includes the position of a rough road, lane information, and the like.

Figure 2:
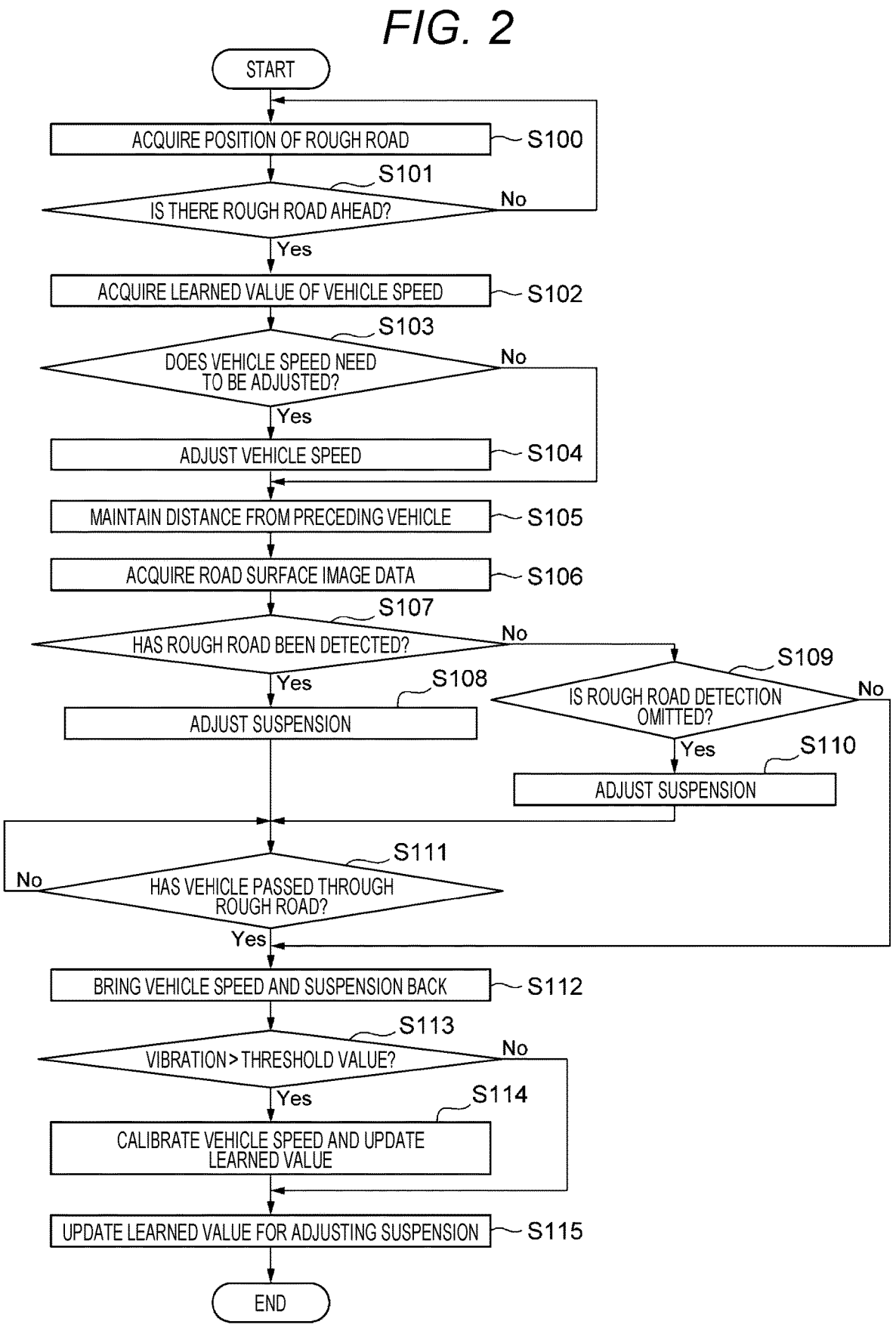
FIG. 2 is a flowchart illustrating control processing of the vehicle control device.

Control processing of the vehicle control device 100 will be described below with reference to FIG. 2. FIG. 2 is a flowchart illustrating control processing of the vehicle control device.

First, in Step S100, the map information acquisition unit 1011 acquires the position of a rough road from the map DB 1012. At this time, the map information acquisition unit 1011 acquires the position of a rough road existing on the road surface of the travel route from the map DB 1012 based on the travel route of the host vehicle, for example.

In Step S101 following Step S100, the rough-road determination unit 1004 determines whether or not there is a rough road within a predetermined range (for example, within 2 km) ahead based on the position of the rough road acquired in Step S100 and the position of the host vehicle estimated by the position estimation unit 1001. When it is determined that there is no rough road, the control processing returns to Step S100. On the other hand, when it is determined that there is a rough road, the control processing proceeds to Step S102.

In Step S102, the rough-road travel unit 1008 acquires the learned value of the vehicle speed stored in the learned value storage unit 1010. Here, the learned value of the vehicle speed is associated with a rough road position of the travel route when the host vehicle has traveled on the travel route so far. When the host vehicle travels on the travel route for the first time, the learned value of the vehicle speed is downloaded in advance from an external server such as a cloud and stored in the learned value storage unit 1010.

In Step S103 following Step S102, the vehicle control device 100 determines whether or not the vehicle speed needs to be adjusted based on the current vehicle speed detected by the vehicle speed sensor 500 and the learned value of the vehicle speed acquired in Step S102. Here, a method of determining whether or not the vehicle speed needs to be adjusted will be described with reference to FIG. 4.

Figure 4:
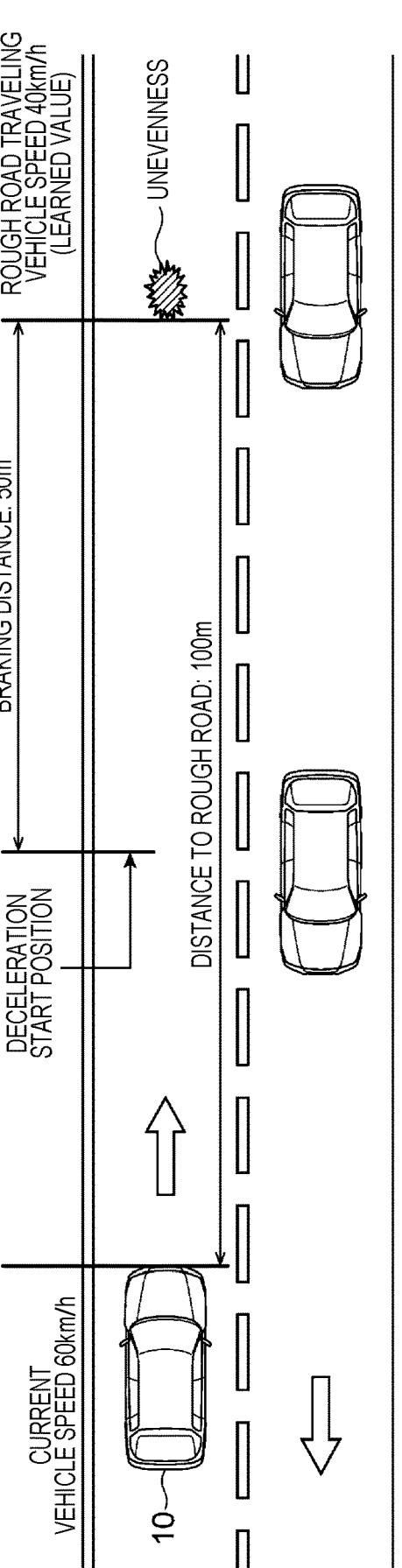
FIG. 4 is a diagram for explaining vehicle speed adjustment of a rough-road travel unit.

FIG. 4 illustrates an example of the learned value of the vehicle speed when the vehicle has traveled on a rough road at a rough-road travelling vehicle speed of 40 km/h. As illustrated in FIG. 4, the vehicle control device 100 first calculates the distance to the rough road based on the position of the rough road acquired in Step S100 and the position of the host vehicle estimated by the position estimation unit 1001. In FIG. 4, it is assumed that, for example, the distance to the rough road is 100 m. Then, the vehicle control device 100 compares the current vehicle speed (for example, 60 km/h) with the learned value (here, the rough-road traveling vehicle speed is 40 km/h) of the vehicle speed acquired in Step S102. When the current vehicle speed is greater than the learned value as a result of the comparison, the vehicle control device 100 determines that the vehicle speed needs to be adjusted.

Subsequently, the vehicle control device 100 calculates a braking distance required when the vehicle decelerates at a deceleration of predetermined G or less from the current vehicle speed to the learned value. In FIG. 4, the braking distance is, for example, 50 m. Subsequently, the vehicle control device 100 determines a deceleration start position by performing inverse calculation from the position of the rough road, based on the calculated braking distance. In this manner, by decelerating the vehicle in accordance with the adjustment of the suspension of the vehicle when the vehicle travels on the rough road, as compared with the case of only the suspension adjustment, it is possible to more suppress the vibration during traveling on the rough road, and to avoid the sudden braking.

Then, when it is determined in Step S103 that the vehicle speed does not need to be adjusted, the control processing proceeds to Step S105. On the other hand, when it is determined that the vehicle speed needs to be adjusted, the control processing proceeds to Step S104.

In Step S104, as described above, the vehicle control device 100 adjusts the vehicle speed so that the learned value of the vehicle speed is obtained.

In Step S105 following Step S104, the rough-road detection-distance maintaining unit 1007 maintains the inter-vehicle distance from the preceding vehicle to be equal to at least the detectable section upper limit (Deadlm2) so that the detectable section of the stereo camera 200 is not blocked by the preceding vehicle. By preventing the detectable section of the stereo camera 200 from being blocked by the preceding vehicle as described above, it is possible to prevent detection omission of a rough road or the like.

In Step S106 following Step S105, the outside environment information acquisition unit 1002 acquires road surface image data captured by the stereo camera 200.

In Step S107 following Step S106, the rough-road determination unit 1004 determines whether or not a rough road has been detected based on the road surface image data acquired in Step S106. Note that a well-known technique can be used for detecting the rough road based on the road surface image data, and thus a detailed description thereof will be omitted.

Then, when it is determined that the rough road has been detected, the control processing proceeds to Step S108. In Step S108, the rough-road travel unit 1008 adjusts the suspension 400 based on the road surface image data acquired in Step S106. A well-known technique can be used for adjusting the suspension of the vehicle based on the road surface image data, and thus a detailed description thereof will be omitted. Then, when Step S108 is ended, the control processing proceeds to Step S111.

On the other hand, when it is determined in Step S107 that the rough road is not detected, the control processing proceeds to Step S109.

In Step S109, the rough-road detection-omission determination unit 1006 determines whether or not detection of the rough road is omitted. Note that the determination as to whether detection of a rough road is omitted will be described later. Then, when it is determined that the detection of the rough road is omitted, the control processing proceeds to Step S110. When it is determined that the detection of the rough road is not omitted, the control processing proceeds to Step S112.

In Step S110, the rough-road travel unit 1008 acquires the learned value of the suspension adjustment stored in the learned value storage unit 1010, and adjusts the suspension 400 based on the acquired learned value of the suspension adjustment. Here, the learned value of the suspension adjustment is associated with the rough road position of the travel route when the host vehicle has traveled on the travel route so far. When the host vehicle travels on the travel route for the first time, the learned value of the suspension adjustment is downloaded in advance from an external server such as a cloud and stored in the learned value storage unit 1010.

In Step S111 following Step S108 or S110, the vehicle control device 100 determines whether or not the vehicle 10 has passed through the rough road based on the rough road position acquired in Step S100 and the current position of the host vehicle estimated by the position estimation unit 1001. When it is determined that the vehicle has passed through the rough road, the control processing proceeds to Step S112.

In Step S112, the rough-road travel unit 1008 brings the vehicle speed adjusted for traveling on the rough road and the suspension 400 back to the state before adjustment.

In Step S113 following Step S112, the vehicle control device 100 determines whether or not the gyro data (that is, vibration of the vehicle) acquired by the gyro data acquisition unit 1003 when the vehicle travels on the rough road is greater than a threshold value set in advance. When it is determined that the gyro data is greater than the threshold value, the control processing proceeds to Step S114. On the other hand, when it is determined that the gyro data is equal to or smaller than the threshold value, the control processing proceeds to Step S115.

In Step S114, the calibration unit 1009 calibrates the vehicle speed when the vehicle travels on the rough road, and stores the calibrated vehicle speed in the learned value storage unit 1010 in association with the position of the rough road, thereby updating the learned value.

In Step S115, the learned value of the suspension adjustment is updated by storing the suspension adjustment value when the vehicle travels on the rough road, in the learned value storage unit 1010 in association with the position of the rough road. As a result, a series of control processing ends.

Figure 3:
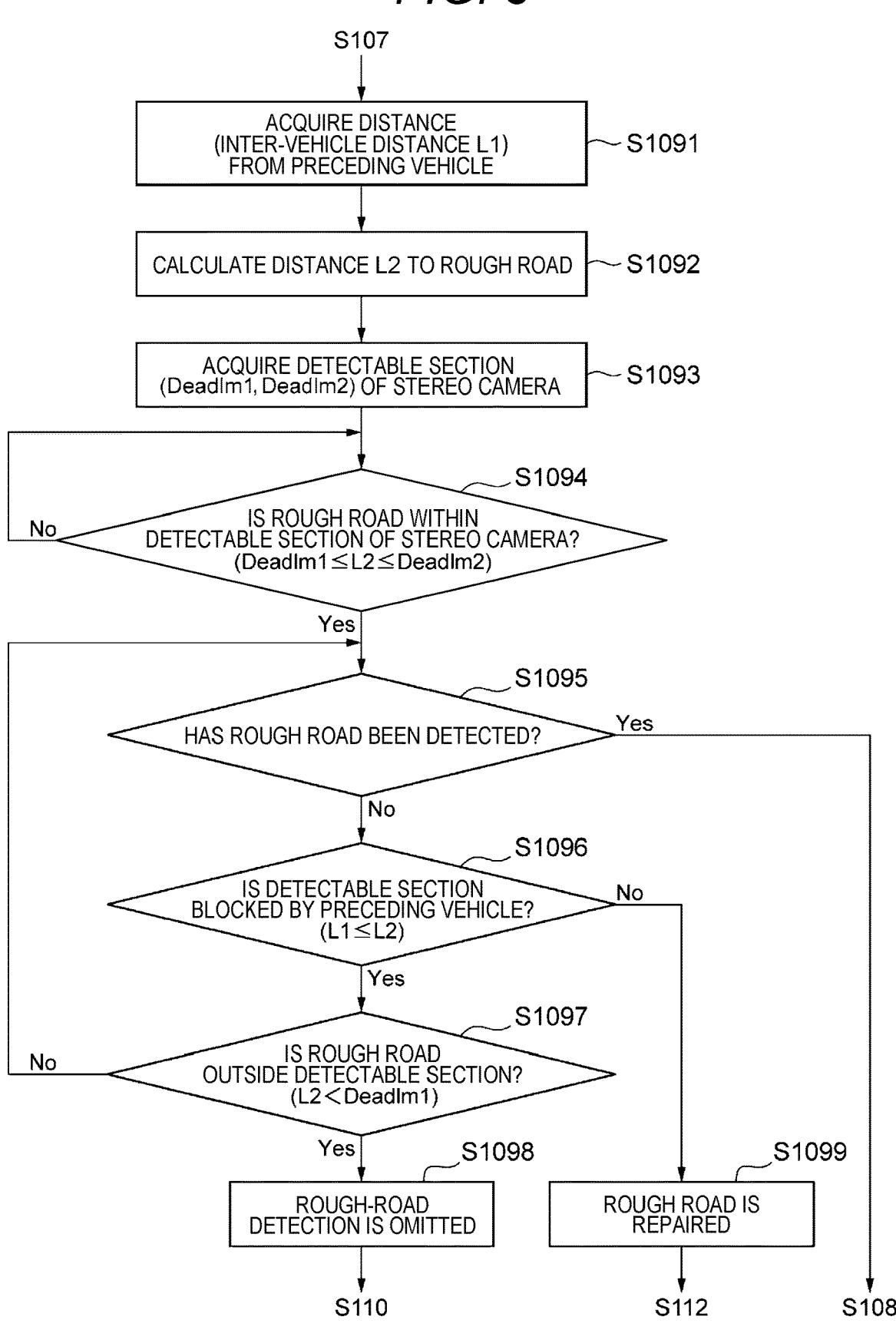
FIG. 3 is a flowchart illustrating a determination process of determining whether or not rough-road detection is omitted.

The determination process in Step S109 will be described below with reference to FIG. 3. FIG. 3 is a flowchart illustrating the determination process of determining whether or not rough-road detection is omitted.

As illustrated in FIG. 3, in Step S1091, the vehicle control device 100 acquires the distance (that is, inter-vehicle distance L1) from the preceding vehicle.

In Step S1092 following Step S1091, the vehicle control device 100 calculates a distance L2 from the host vehicle to the rough road based on the position of the host vehicle estimated by the position estimation unit 1001 and the position of the rough road acquired in Step S100.

In Step S1093 following Step S1092, the vehicle control device 100 acquires a detectable section of the stereo camera 200. At this time, the vehicle control device 100 acquires a detectable section lower limit (Deadlm1) and a detectable section upper limit (Deadlm2) for defining a detectable section.

In Step S1094 following Step S1093, the vehicle control device 100 determines whether or not a rough road exists within the detectable section of the stereo camera 200 (that is, whether or not a relationship of Deadlm1$\leq$L2$\leq$Deadlm2 is satisfied). When it is determined that the rough road exists within the detectable section of the stereo camera 200, the control processing proceeds to Step S1095. On the other hand, when it is determined that the rough road does not exist within the detectable section of the stereo camera 200, the process of Step S1094 is repeatedly executed.

In Step S1095 following Step S1094, the rough-road determination unit 1004 determines whether or not a rough road has been detected based on the road surface image data acquired in Step S106. Then, when it is determined that the rough road has been detected, the control processing proceeds to Step S108 described above. On the other hand, when it is determined that the rough road is not detected, the control processing proceeds to Step S1096. Note that the process of Step S1095 is similar to that in Step S107 described above, and thus may be omitted.

In Step S1096, the vehicle control device 100 determines whether or not the detectable section of the stereo camera 200 is blocked by the preceding vehicle (that is, whether or not a relationship of L1≤L2 is satisfied).

When L1>L2, the vehicle control device 100 determines that the detectable section is not blocked by the preceding vehicle. As a result, the control processing proceeds to Step S1099. In Step S1099, the vehicle control device 100 determines that the detection of the rough road is not omitted and the rough road has been repaired. Then, when Step S1099 is ended, the control processing proceeds to Step S112 described above.

On the other hand, when L1≤L2 in Step S1096, the vehicle control device 100 determines that the detectable section is blocked by the preceding vehicle. As a result, the control processing proceeds to Step S1097. In Step S1097, the vehicle control device 100 determines whether or not the rough road is outside the detectable section of the stereo camera 200 (that is, whether or not a relationship of L2<Deadlm1 is satisfied).

Then, when L2≥Deadlm1, the vehicle control device 100 determines that the rough road is not outside the detectable section of the stereo camera 200. As a result, the control processing returns to Step S1095.

On the other hand, when L2<Deadlm1, the vehicle control device 100 determines that the rough road is outside the detectable section of the stereo camera 200, and the control processing proceeds to Step S1098. In Step S1098, the rough-road detection-omission determination unit 1006 determines that there is a rough-road detection omission. As a result, the control processing proceeds to Step S110 described above.

In the vehicle control device 100 configured as described above, when the rough-road determination unit 1004 determines that there is the rough road within the predetermined range in front of the vehicle based on the position of the vehicle 10 estimated by the position estimation unit 1001 and the position of the rough road acquired by the map information acquisition unit 1011, and the rough-road determination unit 1004 determines that the rough road is not detected based on the road surface image data acquired by the outside environment information acquisition unit 1002, the rough-road detection-omission determination unit 1006 determines whether or not detection of the rough road is omitted based on the position of the rough road acquired by the map information acquisition unit 1011 and the detectable section of the stereo camera 200. In this manner, even when the detectable section of the stereo camera 200 is blocked by the preceding vehicle, it is possible to reliably prevent detection omission of a rough road.

Note that, in the present embodiment, it is assumed that it is not possible for the vehicle 10 to avoid a rough road, but the vehicle 10 may travel to avoid the rough road. In this case, for example, the map information acquisition unit 1011 further acquires lane information included in the map information, and the vehicle control device 100 performs traveling to a travel lane without a rough road based on the lane information and the position of the rough road acquired by the map information acquisition unit 1011. In this manner, it is possible to realize traveling that can avoid a rough road by changing to a travel lane without a rough road.

In addition, the vehicle control device 100 may be further provided with a route generation unit that generates a travel route to a destination. The route generation unit may generate a travel route for avoiding the rough road based on the position of the rough road acquired by the map information acquisition unit 1011. In this manner, since it is possible to generate a route that can avoid a rough road, it is possible to realize traveling that can avoid a rough road.

[Regarding Autonomous Driving System]

Figure 5:
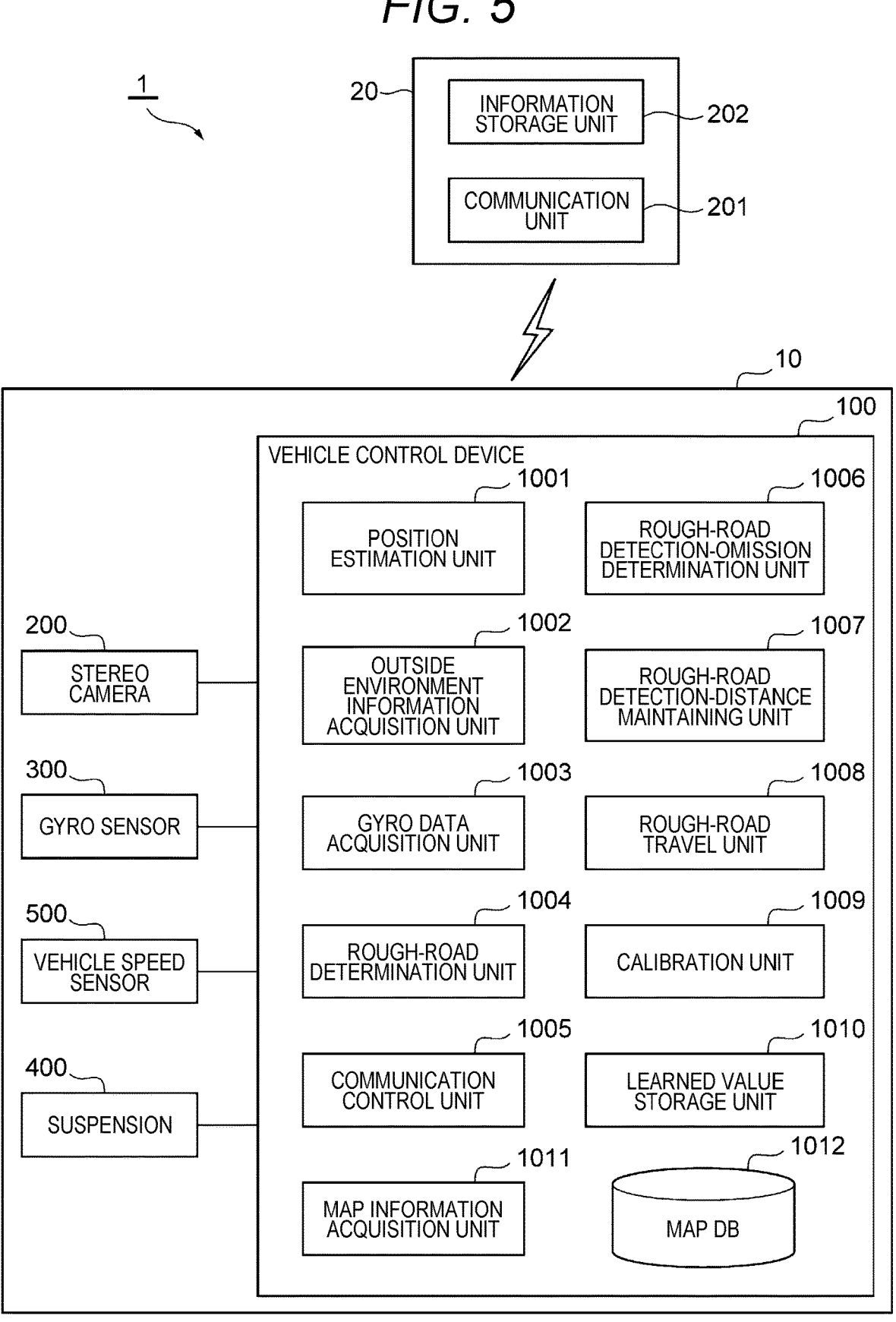
FIG. 5 is a block diagram illustrating an autonomous driving system according to the embodiment.

FIG. 5 is a block diagram illustrating an autonomous driving system according to the embodiment. An autonomous driving system 1 in the present embodiment includes the vehicle 10 described above and a cloud 20 communicably connected to the vehicle 10.

A cloud 20 corresponds to an "external server" described in the claims, and includes a communication unit 201 that communicates with the vehicle 10, and an information storage unit 202 that stores the learned value of the vehicle speed and the learned value of the suspension adjustment, which have been received by the communication unit 201.

The communication unit 201 transmits and receives information to and from the vehicle 10 via a network (not illustrated). The information storage unit 202 filters the received learned value of the vehicle speed and the received learned value of the suspension adjustment, and the specification of vehicle 10, and stores the results of filtering.

In the autonomous driving system 1 configured as described above, the cloud 20 stores and accumulates the learned value of the vehicle speed and the learned value of the suspension adjustment, which are transmitted from a plurality of vehicles 10, and transmits, for example, the stored learned value of the vehicle speed and learned value of the suspension adjustment to the request vehicle in response to the request of the vehicle. In this manner, it is possible to share the learned values by the plurality of vehicles. In addition, since the learned value of the vehicle speed and the learned value of the suspension adjustment are associated with the position of the rough road, even when another vehicle travels on the rough road for the first time, the vehicle can travel based on these learned values, so that excellent traveling comfort can be obtained.

Hitherto, although the embodiment of the present invention has been described in detail above, the present invention is not limited to the above-described embodiment, and various design changes can be made without departing from the spirit of the present invention described in the claims.

REFERENCE SIGNS LIST 1 autonomous driving system
10 vehicle
20 cloud
100 vehicle control device
200 stereo camera (in-vehicle camera)
300 gyro sensor
400 suspension 500 vehicle speed sensor
1001 position estimation unit
1002 outside environment information acquisition unit
1003 gyro data acquisition unit (vibration acquisition unit)
1004 rough-road determination unit
1005 communication control unit
1006 rough-road detection-omission determination unit
1007 rough-road detection-distance maintaining unit
1008 rough-road travel unit
1009 calibration unit
1010 learned value storage unit
1011 map information acquisition unit
1012 map DB

The invention claimed is:

1. A vehicle control device, comprising:
a microcomputer configured to estimate a position of a vehicle;
　acquire outside environment information including road surface information based on an image captured by an in-vehicle camera that captures an image of a front of the vehicle;
　acquire map information including a position of a rough road;
　adjust at least one of a suspension and a vehicle speed of the vehicle and travels on the rough road;
　determine whether or not there is the rough road within a predetermined range in front of the vehicle based on the estimated position of the vehicle and the acquired position of the rough road, and determine whether or not the rough road has been detected based on the acquired road surface information; and
　determine whether or not rough-road detection is omitted based on the acquired position of the rough road and a detectable section of the in-vehicle camera, when it is determined that there is the rough road within the predetermined range in front of the vehicle based on the position of the estimated vehicle and the acquired position of the rough road, and it is determined that the rough road is not detected based on the acquired road surface information.

2. The vehicle control device according to claim 1, further comprising:
　a sensor that acquires vibration of the vehicle; and
　wherein the microcomputer is configured to calibrate a vehicle speed based on the vibration of the vehicle acquired by the sensor when the vehicle travels on the rough road.

3. The vehicle control device according to claim 1, wherein the microcomputer is configured to determine a distance to be maintained from a preceding vehicle so that a detectable section of the in-vehicle camera is not blocked by a preceding vehicle.

4. The vehicle control device according to claim 2, further comprising a memory that stores the calibrated vehicle speed, as a learned value of the vehicle speed, in association with the position of the rough road.

5. The vehicle control device according to claim 4, wherein, when it is determined that there is the rough road within the predetermined range in front of the vehicle based on the estimated position of the vehicle and the acquired position of the rough road microcomputer adjusts the vehicle speed based on the learned value of the vehicle speed stored in the memory.

6. The vehicle control device according to claim 4, wherein memory stores an adjustment value of the adjusted suspension, as a learned value of suspension adjustment, in association with the position of the rough road.

7. The vehicle control device according to claim 6, wherein the microcomputer is configured to, upon determining that rough-road detection has been omitted, adjust the suspension of the vehicle based on the learned value of the suspension adjustment stored in the memory.

8. The vehicle control device according to claim 6, further comprising a communication control unit that controls transmission of the learned value of the vehicle speed and the learned value of the suspension adjustment, which are stored in the memory, to an external server, and reception of the learned value of the vehicle speed and the learned value of the suspension adjustment, which are stored in the external server.

9. The vehicle control device according to claim 1, wherein the microcomputer is configured to
　acquire lane information included in the map information, and
　cause the vehicle to travel to a lane without the rough road based on the lane information and the acquired position of the rough road.

10. The vehicle control device according to claim 1, wherein the microcomputer is configured to generate a travel route to a destination, and
　a generate a travel route for avoiding the rough road based on the position of the acquired rough road.

11. An autonomous driving system comprising:
a vehicle on which the vehicle control device described in claim 1 is mounted; and
an external server configured to be able to communicate with the vehicle, wherein
the external server includes
　a communication unit that communicates with the vehicle, and
　a memory configured to store the learned value of the vehicle speed and the learned value of the suspension adjustment, which are received by the communication unit.

* * * * *